US005470622A

United States Patent [19]
Rinde et al.

[11] Patent Number: 5,470,622
[45] Date of Patent: Nov. 28, 1995

[54] ENCLOSING A SUBSTRATE WITH A HEAT-RECOVERABLE ARTICLE

[75] Inventors: James A. Rinde, Fremont; Richard M. Rowe, Los Gatos, both of Calif.

[73] Assignee: Raychem Corporation, Menlo Park, Calif.

[21] Appl. No.: 308,864

[22] Filed: Sep. 19, 1994

Related U.S. Application Data

[63] Continuation of Ser. No. 843,753, Feb. 28, 1992, abandoned, which is a continuation-in-part of Ser. No. 609,682, Nov. 6, 1990, abandoned at PCT/US91/08259, Nov. 6, 1991.

[51] Int. Cl.$^6$ .............................. B65B 53/02; B32B 31/06
[52] U.S. Cl. .......................... 428/34.9; 428/349; 156/87; 156/86; 174/84 R; 174/DIG. 8
[58] Field of Search .................................. 428/34.9, 349; 156/84, 86; 174/84 R, DIG. 8

[56] References Cited

U.S. PATENT DOCUMENTS

| | | | |
|---|---|---|---|
| 2,027,962 | 1/1936 | Currie | 18/55 |
| 3,086,242 | 4/1963 | Cook et al. | 18/1 |
| 3,379,218 | 4/1968 | Conde | 138/99 |
| 3,455,336 | 7/1969 | Ellis | 138/156 |
| 3,530,898 | 9/1970 | Wilson | 138/99 |
| 3,542,077 | 11/1970 | Muchmore | 138/99 |
| 4,085,286 | 4/1978 | Horsma et al. | 174/92 |

(List continued on next page.)

FOREIGN PATENT DOCUMENTS

| | | |
|---|---|---|
| 75901 | 4/1983 | European Pat. Off. . |
| 110102 | 6/1984 | European Pat. Off. . |
| 0117737 | 9/1984 | European Pat. Off. . |
| 0117736 | 9/1984 | European Pat. Off. . |
| 0152213 | 8/1985 | European Pat. Off. . |
| 0173541 | 3/1986 | European Pat. Off. . |
| 0274899 | 7/1988 | European Pat. Off. . |
| 0281354 | 9/1988 | European Pat. Off. . |
| 0307197 | 3/1989 | European Pat. Off. . |
| 0373440 | 6/1990 | European Pat. Off. . |
| 2139953 | of 0000 | Germany . |
| 2550778 | 6/1976 | Germany . |
| 3015387 | 4/1982 | Germany . |
| 21911 | 10/1967 | Israel . |
| 43087 | 8/1973 | Israel . |
| 59-36156 | 2/1984 | Japan . |
| 60-120779 | 6/1985 | Japan . |
| 61-81476 | 4/1986 | Japan . |
| 62-141083 | 6/1987 | Japan . |
| 62-153349 | 7/1987 | Japan . |
| 1265194 | 3/1972 | United Kingdom . |
| 1440524 | 6/1976 | United Kingdom . |
| 2207676 | 2/1989 | United Kingdom . |
| WO84/04320 | 11/1984 | WIPO . |

OTHER PUBLICATIONS

Journ of Applied Polymer Sci. vo. 22 3511–3524, 1978 (Aharoni et al.).
Supplementary European Search Report, EP 92900053, mailed Sep. 28, 1993.
Saechtling International Plastics Handbook for the Technologist, Engineer and User, 2d edition, 1987, pp. 1–2.
Engineered Materials Handbook, Engineering Plastics, vol. 2, pp. 240–241.

(List continued on next page.)

Primary Examiner—Joseph L. Schofer
Assistant Examiner—John M. Cooney, Jr.
Attorney, Agent, or Firm—Marguerite E. Gerstner; Herbert G. Burkard

[57] ABSTRACT

A substrate (12,14) is enclosed with a heat recoverable backing with a layer of a thermosetting adhesive composition (20) comprising an amorphous thermoplastic resin and a thermosetting resin positioned between the heat recoverable article (10, 26) and the substrate (12,14). The adhesive composition can be in the form of a self supporting sheet or tape or it can be on a surface of the heat recoverable article (10). In some embodiments, a polymeric insert (32) is also used to ensure adequate sealing between the substrate and the thermosetting adhesive.

18 Claims, 3 Drawing Sheets

U.S. PATENT DOCUMENTS

| | | |
|---|---|---|
| 4,115,619 | 9/1978 | Kurfman et al. |
| 4,125,739 | 11/1978 | Bow . |
| 4,177,446 | 12/1979 | Diaz ......................................... 338/212 |
| 4,342,800 | 8/1982 | Changani et al. ......................... 428/36 |
| 4,366,201 | 12/1982 | Changnai et al. ....................... 428/157 |
| 4,392,898 | 7/1983 | Pithouse et al. ......................... 156/85 |
| 4,421,582 | 12/1983 | Horsma et al. ........................... 156/86 |
| 4,496,410 | 1/1985 | Davis et al. .............................. 156/84 |
| 4,507,340 | 3/1985 | Rinde et al. ............................. 428/418 |
| 4,645,805 | 2/1987 | Gaku et al. .............................. 525/437 |
| 4,656,208 | 4/1987 | Chu et al. ................................ 523/400 |
| 4,661,559 | 4/1987 | Gardner et al. .......................... 525/423 |
| 4,707,388 | 11/1987 | Park et al. ................................ 428/36 |
| 4,729,920 | 3/1988 | McLoughlin et al. .................. 428/229 |
| 4,774,134 | 9/1988 | Kehe et al. ............................... 428/335 |
| 4,775,501 | 10/1988 | Rosenzweig et al. ..................... 264/27 |
| 4,798,752 | 1/1989 | McLoughlin et al. ..................... 428/36 |
| 4,844,959 | 7/1989 | Read et al. .............................. 428/34.9 |
| 4,853,165 | 8/1989 | Rosenzweig et al. ..................... 264/27 |
| 4,866,252 | 9/1989 | van Loo et al. .......................... 219/535 |
| 4,935,270 | 6/1990 | Read et al. .............................. 428/34.9 |
| 4,944,987 | 7/1990 | Cordia et al. ............................ 428/192 |
| 4,962,162 | 10/1990 | Kosuda et al. ........................... 525/423 |

OTHER PUBLICATIONS

U.S. Application Serial No. 07/788,655 (Rinde et al), filed Nov. 6, 1991.

30th National SAMPE Symposium, Mar. 19–21, 1985, "Chemical Modification of Matrix Resin Networks with Engineering Thermoplastics II Morphology and Prepoerties of Poly(Aryl Ether Sulfone) Modified Epoxy Networks" (Hedrick et al).

29th National SAMPE Symposium, Apr. 3–5, 1984, "Development of Resins for Damage Tolerant Composites—A Systematic Approach" (Daimant et al).

Journal of Applied Polymer Science, vol. 22, 3511–3524, 1978, "Thermoplastic—Thermosetting Hybrid Polymer Systems as Gap–Filling Adhesives" (Aharoni et al).

The British Polymer Journal, vol. 15, Mar. 1983, "Addition of Polyethersulphone to Epoxy Resins", (Bucknall et al).

FIG_1

FIG_2

FIG_3

FIG_4

FIG_5

FIG_6

ENCLOSING A SUBSTRATE WITH A HEAT-RECOVERABLE ARTICLE

CROSS-REFERENCE TO RELATED APPLICATIONS

This application is a continuation of commonly assigned application Ser. No. 07/843,753, filed Feb. 28, 1992, now abandoned, which is a continuation-in-part of commonly assigned application Ser. No. 07/609,682, filed Nov. 6, 1990 (Rinde), now abandoned, and of International Application No. PCT/US91/08259, filed Nov. 6, 1991 (Raychem Corporation), the disclosures of which are incorporated herein by reference.

BACKGROUND OF THE INVENTION

1. Field of the Invention

This invention relates to a method of enclosing a substrate using a heat recoverable article and a curable adhesive and to a heat recoverable article having a curable adhesive on a surface thereof.

2. Introduction to the Invention

Many methods are known for joining, repairing, protecting, reinforcing and otherwise modifying pipes and other substrates. In some of those methods, an insert, composed of a polymeric material which can be deformed under heat and pressure, is placed between the substrate and a heat-recoverable article. When heat is applied, the article recovers toward the substrate, and the insert softens and bonds the recovered article to the substrate. Typically heat is applied by means of a torch, air gun, oven or the like. More recently, devices have been developed in which heat recoverable articles are recovered by electrically heating the article by passing electrical current through the article or a conductor embedded in or adjacent the article. Reference may be made for example to U.S. Pat. Nos. 4,085,286 (Horsma et al), 4,177,446 (Diaz), 4,421,582 (Horsma et al), 4,775,501 (Rosenzweig), 4,853,165 (Rosenzweig), and 4,944,987 (Cordia et al), to European Patent Application Nos. 173,541 (Becker et al) and 307,197 (Gansbuehler), and U.K. Patent No. 1,265,194 (Cook), the disclosures of which are incorporated herein by reference.

Typically, the insert comprises a thermoplastic hot melt adhesive, e.g. a thermosetting adhesive. The use of thermosetting adhesives is disclosed in U.S. Pat. Nos. 4,707,388 (Park et al), 4,729,920 (McLoughlin et al), 4,798,752 (McLoughlin et al), 4,844,959 (Read et al) and 4,935,270 (Read et al), and European published patent applications Nos. 117,736 (Pithouse et al), 117,737 (Harris et al), 152,213 (Cordia et al) and 281,354 (Park et al), and International patent application No. WO84/04320 (Senior et al). The reactive components of these thermosetting resin adhesives generally are maintained apart from one another, for example, as particles or fibers, or require an accelerator which is applied to the substrate or otherwise brought into contact with the thermosetting resin at the time it is installed. These articles perform very well but are difficult to manufacture and/or have been found to have a relatively short shelf life. Many commercially successful articles are provided with a coating of reactive particles. However, special care must be taken during manufacture, storage and use to prevent the powdered reactive components from flaking off from the backing.

Thermoplastic epoxy adhesives and pre-pregs are also known, for example in U.S. Pat. No. 4,656,208 (Chu et al), Japanese Kokai Nos. 59-36156 (Kubo et al), 62-141083 (Ohmori et al), 62-153349 (Suzue et al), 60-120779 (Miyauchi et al), and 61- 81476 (Nishiyama et al), in European patent application No. 373,440 (Weber et al), and in UK Patent Application GB 2207676A (Schmid et al), the disclosures of which are incorporated herein by reference. However, the use of these adhesives and pre-pregs in combination with heat-recoverable articles which shrink fit the adhesives and/or pre-pregs until they bond to and join together pipes and the like is neither suggested nor disclosed by the aforementioned patents.

Prior art polymers which have been used as adhesives and have been bonded to articles, for example pipes, being joined to one another using heat-recovering articles, have generally not been sufficiently non-tacky so as to be easily handled and positioned in place for forming such bonds, have generally not been tough enough to be easily wrapped around facing pipe ends without cracking and have generally not had a desirably long shelf life. In addition, when the two substrates to be joined are of different materials, e.g. when a metal pipe is to be joined to a glass-reinforced pipe, there may be a problem with differential thermal expansion between the substrates and the adhesive, resulting in cracking, voids, and poor bonds.

The present invention is directed to overcoming one or more of the problems as set forth above.

SUMMARY OF THE INVENTION

One aspect of this invention provides a method of enclosing a substrate, said method comprising:

(a) positioning a heat recoverable article around the substrate;

(b) positioning a layer of a thermosetting adhesive composition between the heat recoverable article and the substrate to be enclosed, said adhesive composition comprising a blend of an essentially amorphous thermoplastic resin and an uncured thermosetting resin; and (c) heating the article and adhesive to cause the article to recover toward the substrate and the adhesive to cure, thereby enclosing the substrate.

Another aspect of the invention provides an article of manufacture comprising a heat recoverable article having on a surface thereof a layer of a thermosetting adhesive composition comprising a blend of an essentially amorphous thermoplastic resin and an uncured thermosetting resin.

A third aspect of the invention provides a method of enclosing a substrate comprising:

(a) positioning a heat recoverable article around the substrate;

(b) positioning a layer of a thermosetting adhesive composition between the heat recoverable article and the substrate to be enclosed, said adhesive composition comprising a blend of an essentially amorphous thermoplastic resin and an uncured thermosetting resin;

(c) positioning a polymeric insert between the thermosetting adhesive layer and the substrate to be enclosed; and (d) heating the article, the thermosetting adhesive, and the polymeric insert to cause the article to recover toward the substrate and the thermosetting adhesive to cure, thereby enclosing the substrate.

DETAILED DESCRIPTION OF THE INVENTION

The present invention provides a composite article 10 useful for enclosing substrates, such as cables, cable splices, pipelines and the like. The present invention is particularly useful for enclosing end portions of substrates, such as pipes, to bond them to one another, for example, for making a leak-proof pipe joint. The composite article 10 of the present invention is relatively easily handled in that it is non-sticky and is sufficiently flexible so that it can be adequately wrapped around relatively small objects without cracking. The adhesive which is to be positioned between the heat recoverable article and the substrate is also sufficiently flexible so that it can be wrapped around relatively small objects without cracking. The composite article and the adhesive articles have a shelf life of several years.

Figure 1:
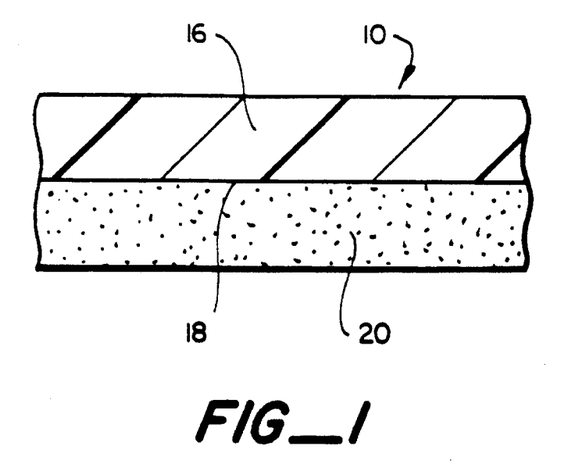
FIG. 1 illustrates, in cross-sectional view, an article of manufacture in accordance with the present invention.
Figure 2:
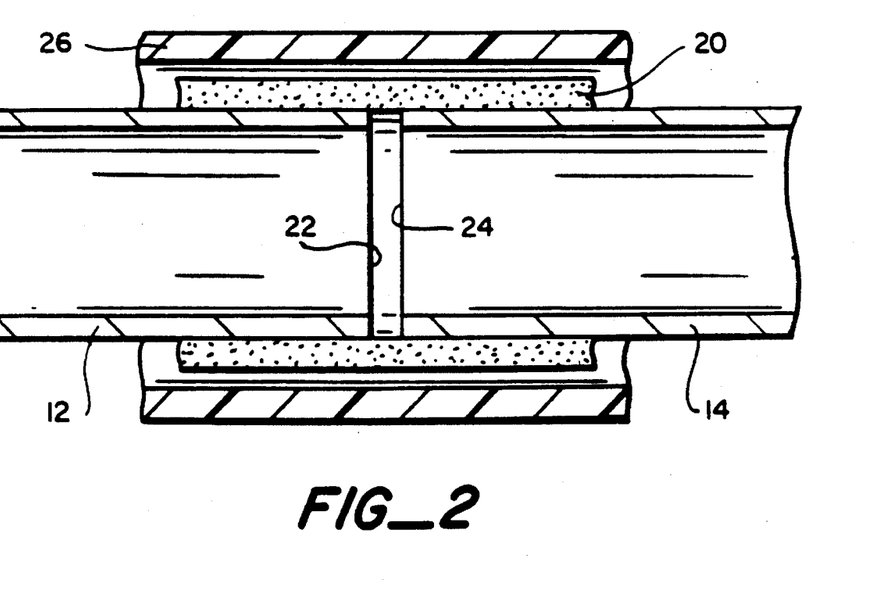
FIG. 2 illustrates, in cross-sectional view, an assembly for joining pipes in accordance with an embodiment of the present invention prior to the formation of a pipe joint.
Figure 3:
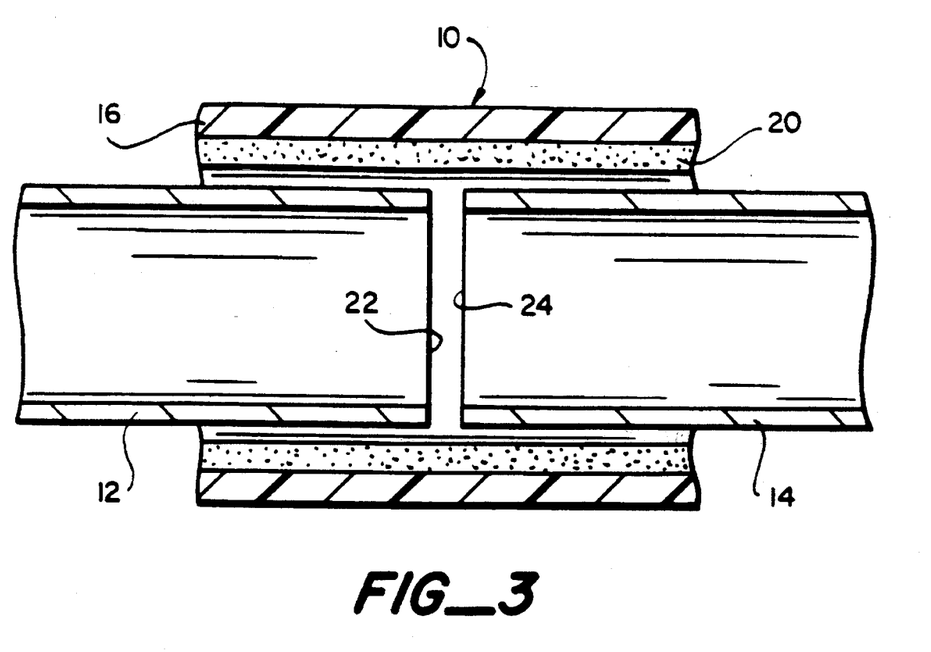
FIG. 3 illustrates, in cross-sectional view, an assembly for joining pipes in accordance with an alternative embodiment of the present invention prior to formation of a pipe joint.
Figure 4:
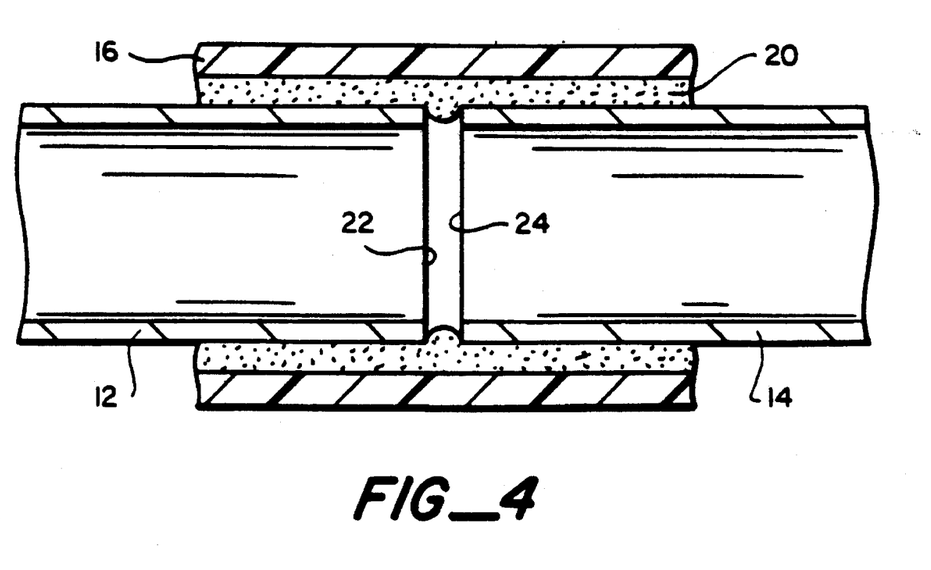
FIG. 4 illustrates, in cross-sectional view, the assembly of FIG. 2 or of FIG. 3 after the pipes have been joined.

In a preferred embodiment of the invention, a composite article 10 is provided which is adapted to enclose a substrate, for example one or more of pipes 12 and 14 (FIGS. 2 to 4). The composite article 10 as shown in FIG. 1 includes a layer 16 of heat recoverable polymeric material, the layer having on surface 18 thereof, an uncured adhesive composition 20. In another preferred embodiment of the invention, a self-supporting layer of the adhesive is positioned between the substrate to be enclosed and a heat recoverable article (FIG. 2).

The adhesive composition 20 comprises a thermoplastic resin, a thermosetting resin and, optionally, a curing agent. The thermoplastic resin is used in the adhesive to provide an overall adhesive composition that is strong, tough and leathery at room temperature in the uncured state. The thermoplastic resin is generally present in an amount from about 10 parts to about 75 parts, preferably from about 15 parts to about 60 parts, and particularly from about 25 parts to about 45 parts (all parts herein are by weight). Any of a wide range of thermoplastic resins may be utilized as components of the adhesive composition of the present invention. The preferred class of thermoplastic resins may be defined as amorphous thermoplastic resins, that is resins which are essentially amorphous (as defined in Saechtling International Plastics Handbook for the Technologist, Engineer and User, Second Edition, 1987, Hanser Publishers, Munich, at page 1, incorporated herein by reference). The term "essentially amorphous" as used herein means that the resin is at most about 25% crystalline, preferably at most about 20% crystalline, particularly at most about 15% crystalline, and especially at most about 5% crystalline. A mixture of resins may be used if desired. The thermoplastic resin is of high molecular weight and may be rigid or rubbery at room temperature.

Illustrative amorphous thermoplastic resins that can be used in the practice of this invention are polysulfones, polyethersulfones, polystyrene, polyphenylene oxide, amorphous polyamides, phenoxy resins, amorphous polyimides, polyetherimides, polyetherimide/silicone block copolymers, polyurethanes, amorphous polyesters, polycarbonates, acrylic resins such as polymethyl methacrylate, styrene/acrylonitrile and styrene block copolymers. Preferred resins are polyetherimides, such as the Ultem™ resins commercially available from General Electric Company, polyetherimide/silicone block copolymers, such as the Siltem™ resins commercially available from General Electric Company, polysulfones, such as Polysulfone P-1700™, commercially available from Union Carbide Corporation, and phenoxy resins, such as Phenoxy PKH-J™ commercially available from Union Carbide Corporation.

The adhesive composition also contains a curable thermosetting resin or mixtures thereof. Such resins are defined on pages 1 and 2 of the Saechtling Plastics Handbook referred to above. The thermosetting resin preferably has a functionality greater than 2. The thermosetting resin is generally present in an amount from about 90 parts to about 25 parts, preferably from about 85 parts to about 40 parts, and particularly from about 75 to about 55 parts by weight of the adhesive composition. The weight ratio of the thermoplastic resin to the thermosetting resin generally falls within a range from about 1:9 to about 3:1. The thermosetting resin may be a liquid or solid at room temperature and when cured (in the absence of the thermoplastic resin) may be rigid or rubbery. Typically, it is an uncured epoxy resin, more particularly an uncured liquid epoxy resin as defined in ASTM D 1763, the disclosure of which is incorporated herein by reference. While the thermosetting resin may suitably be a liquid epoxy resin, due to blending with the thermoplastic resin the resulting adhesive composition is not itself liquid but is instead a tough leathery film. Liquid epoxy resins are described in some detail in Volume 2 of Engineered Materials Handbook, Engineering Plastics, published by ASM International, particularly at pages 240–241, and the description therein is incorporated by reference.

The term "epoxy resin" is used herein to mean any of the conventional dimeric, oligomeric or polymeric epoxy materials containing a plurality, i.e. at least 2, of epoxy functional groups. Types of epoxy resins that can be used include, for example, the reaction product of bisphenol A and epichlorohydrin, the reaction product of phenol and formaldehyde (novolac resin) and epichlorohydrin, cycloaliphatic and peracid epoxies, glycidyl esters, the reaction product of epichlorohydrin and p-amino phenol, the reaction product of epichlorohydrin and glyoxal tetraphenol and the like.

Suitable commercially available epoxidic esters are preferably 3,4-epoxycyclo-hexylmethyl 3,4-epoxycyclohexanecarboxylate (Union Carbide ERL™ 4221 or Ciba Geigy CY-179™), as well as bis(3,4,epoxycyclohexylmethyl)adipate (Union Carbide ERL™ 4299).

Suitable commercially available diglycidic ethers of bisphenol-A are Ciba Geigy Araldite™ 6010, Dow Chemical DER™ 331, and Shell Chemical Epon™ 825, 828, 826, 830, 834, 836, 1001, 1004, 1007, etc.

A polyepoxidized phenol formaldehyde novolac prepolymer is available from Dow Chemical as DEN™ 431 and 438 and from Ciba Geigy as CY-281™, and a polyepoxidized cresol formaldehyde novolak prepolymer is available from Ciba Geigy as ECN™ 1285, 1280 and 1299.

A polyglycidyl ether of polyhydric alcohol is available from Ciba Geigy, based on butane-1,4-diol, as Araldite™ RD-2; and from Shell Chemical Corporation based on glycerine, as Epon™ 812.

A suitable diepoxide of an alkylcycloalkyl hydrocarbon is vinyl cyclohexene dioxide, Union Carbide ERL™ 4206; and a suitable diepoxide of a cycloalkyl ether is bis(2,3-epoxycyclopentyl)-ether, Union Carbide ERL™ 0400.

Suitable commercially available flexible epoxy resins include polyglycol diepoxies, DER™ 732 and 736, from Dow Chemical Company, diglycidyl ester of linoleic dimer acid, Epon™ 871 and 872 from Shell Chemical Company, and diglycidyl ester of a bisphenol in which the aromatic rings are linked by a long aliphatic chain, Lekutherm™ X-80, from Mobay Chemical Company.

High functional epoxy resins (i.e. functionality greater than 2) which can be used include for example, a solid epoxy novolac resin, DEN™ 485 from Dow Chemical Company, a tetrafunctional solid epoxy resin, Epon™ 1031 from Shell Chemical Company, and N,N,N',N'-tetraglycidyl-4,4'-methylenebisbenzenamine, Araldite™ MY 720 from Ciba-Geigy Corporation. Difunctional epoxy resins which can be used include, for example, a solid resin, N,N,N',N'-tetraglycidyl-a, a'-bis(4-aminophenyl)-p-diisopropylbenzene, HPT™ 1071 from Shell Chemical Company, solid diglycidyl ether of bisphenol-9-fluorene, HPT™ 1079 from Shell Chemical Company, and triglycidylether of para-aminophenol, Araldite™ 0500/0510 from Ciba-Geigy Corporation.

The brittleness of a blend of the thermoplastic resin and the thermosetting resin is a function of the brittleness properties of both resin components. Thus, with relatively rigid thermoplastic resins, a liquid thermosetting resin should be used. However, if the thermoplastic resin is relatively flexible, then a solid or semi-solid thermosetting resin may be used.

It is preferred that the thermosetting and thermoplastic resins be substantially mutually soluble. The term "substantially mutually soluble" as used herein means that the resins, when mixed, form a solution having a single glass transition temperature ($T_g$).

The composition may also contain a relatively high temperature curing agent which cures or crosslinks with, or catalyzes polymerization of, the thermosetting resin. The curing agent is selected to provide rapid curing of the epoxy resin at a temperature which exceeds the temperature at which the thermoplastic resin, the uncured epoxy resin and the epoxy curing agent are intimately intermixed and must not initiate substantial curing during blending which is generally in the range from about 25° C. to about 100° C. The epoxy curing agent is present in an amount such that the adhesive will cure upon its being heated to a temperature above the mixing temperature is preferred that the curing agent will not initiate substantial curing at temperatures below about 100° C. and is such that the adhesive composition will remain substantially uncured for at least about one year, more preferably two or more years, at 25° C. Suitable curing agents for an epoxy thermosetting resin may be isophthaloyl dihydrazide, benzephenone tetracarboxylic dianhydride, diethyltoluene diamine, 3,5-dimethylthio-2,4-toluene diamine, dicyandiamide (Dicy™) which can be obtained, for example, from American Cyanamid, Curazol™ 2PHZ, which is a substituted imidazole obtainable from Pacific Anchor, DDS, diaminodiphenyl sulfone, obtainable from Ciba-Geigy, or Calcure™, a substituted urea available from Pacific Anchor. Other epoxy curing agents which can be used include, for example, substituted dicyandiamides, such as 2,6-xylenyl biguanide, solid polyamides, such as HT-939™ available from Ciba-Geigy, Ancamine™ 2014AS available from Pacific Anchor, solid aromatic amines HPT™ 1061 and 1062 available from Shell, solid anhydride hardeners, such as pyromellitic dianhydride, phenolic resin hardeners, such as poly(p-hydroxy styrene), imidazoles, 2-phenyl-4,5-dihydroxy-methylimidazole and 2,4-diamino- 6 [2'-methylimidazolyl-(1)] ethyl-s-triazine isocyanate adduct, and boron trifluoride:amine complexes, such as Anchor™ 1222 and 1907 from Pacific Anchor.

A preferred curing agent for an epoxy thermosetting resin is dicyandiamide. A curing accelerator can be used together with the dicyandiamide. Typical accelerators include urea, a urea compound, such as, 3-phenyl-1,1-dimethylurea, 3-(4-chlorophenyl)- 1,1-dimethyl urea, 3-(3,4-dichlorophenyl)-1, 1-dimethyl urea, 3-(3-chloro-4-methylphenyl)-1,1-dimethyl urea, or an imidazole such as, 2-heptadecylimidazole, 1-cyanoethyl-2-phenylimidazole-trimellitate or 2-[b-{2'-methylimidazoyl-(1')}]-ethyl- 4,6-diamino-s-triazine.

If the thermosetting resin is, for example, a urethane, the curing agent can be a blocked isocyanate such as an alkyl phenol blocked isocyanate, such as Desmocap™ 11A, available from Mobay Corporation or a phenol blocked polyisocyanate adduct, Mondur™ S available from Mobay Corporation.

If the thermosetting resin is an unsaturated polyester resin, the curing agent can be a peroxide or other free radical catalyst. such as dicumyl peroxide, 2,5-dimethyl-2,5-di(tbutylperoxy)hexane, t-butyl cumyl peroxide, 2,5-dimethyl-2, 5-di(t-butylperoxy)hexyne- 3. The unsaturated polyester resin can be crosslinked by irradiation, e.g. by ultra violet radiation, high energy electrons or gamma radiation.

If the thermosetting resin is a bismaleimide there is no need for a curing agent. The resin will crosslink at elevated temperatures. Co-curing resins such as O,O'-diallyl bisphenol A can be included to toughen the cured bismaleimide.

Many of the resins described in the detailed description of the invention can be cured by the use of peroxide crosslinking agents, high energy electrons, or gamma radiation. For these materials, it is often preferred to add unsaturated crosslinking aids such as triallyl isocyanurate, triallyl cyanurate, or trimethylol propane triacrylate.

In accordance with the present invention, the uncured adhesive composition is preferably melt processable and can be extruded, or otherwise melt shaped into any desired configuration. The uncured adhesive may be self-supporting in the form of a sheet, tape, tube or molded article of the desired shape. It can be readily installed around a substrate to be enclosed. The composite article of this invention can be formed by separately forming a heat recoverable article and then applying a layer of the uncured adhesive composition, for example by lamination or compound extrusion. In a preferred embodiment, the composite article is formed by coextruding a polymeric material which can be rendered heat recoverable and the uncured adhesive composition, and then rendering the polymeric material heat recoverable. In order to avoid premature curing of the thermosetting resin, the mixing and processing temperatures of the components should be below the temperature at which significant cure of the thermosetting resin occurs.

In accordance with the present invention the uncured adhesive composition should be flexible at 25° C. and should be substantially non-sticky. In order to provide a quantitative test of flexibility a test was devised for wrapping the uncured composition (not supported by the heat recoverable backing)

about a cylindrical mandrel. The uncured adhesive composition should be able to be wrapped without cracking around a 0.5 inch (1.27 cm) diameter mandrel, preferably around a 0.375 inch (0.953 cm) diameter mandrel, particularly around a 0.25 inch (0.635 cm) diameter mandrel, especially around a 0.188 inch (0.476 cm) diameter mandrel, and most especially around a 0.125 inch (0.318 cm) diameter mandrel. In general, a strip of uncured solid epoxy resin will crack when wrapped about a 0.5 inch (1.27 cm) diameter mandrel, while a typical composition of this invention comprising a thermoplastic resin and an epoxy resin can be wrapped around a 0.125 inch (0.318 cm) diameter mandrel without cracking.

Non-stickiness is measured by using an adhesives blocking test as set forth in ASTM D-1146-53, which is incorporated herein by reference. This tests the blocking point of adhesive layers. Basically it is required that the uncured adhesive composition should, at room temperature, show no more than first degree blocking (no damage on separation of the adhesive layers), and preferably no blocking as defined in the aforementioned ASTM test.

The polymeric material of heat recoverable layer 16 can be of any desired composition, preferably one which is bondable to the uncured adhesive composition 20. For example, the polymer of 16 can be polyethylene, an ethylene copolymer, for example, with an acrylic acid or ester, a vinylidene fluoride polymer or copolymer such as those polyvinylidene fluorides commercially available from Atochem under the tradename Kynar™, an ethylene/tetrafluoroethylene copolymer (ETFE) or a blend of ETFE with a fluorinated thermoplastic elastomer such as the blends described in U.S. Pat. No. 4,935,467 (Cheng et al), the disclosure of which is incorporated herein by reference, nylon or other polyamides, or a fluoroelastomer such as a Viton™ copolymer (available commercially from Du Pont), or Aflas™ (available commercially from Asahi Glass).

In their most common form, heat recoverable articles comprise a heat-shrinkable sleeve or tube made from a polymeric material exhibiting the property of elastic or plastic memory as described, for example, in U.S. Pat. Nos. 2,027,962 and 3,086,242, the disclosures of which are incorporated herein by reference. As disclosed in U.S. Pat. No. 2,027,962, the original dimensionally heat-stable form may be a transient form in a continuous process in which, for example, an extruded tube is expanded, while hot, to a dimensionally heat unstable form but, in other applications, a preformed dimensionally heat-stable article is deformed to a dimensionally heat-unstable form in a separate stage.

In the production of heat recoverable articles, the polymeric material may be cross-linked at any stage in the production of the article that will enhance the desired dimensional recoverability. One manner of producing a heat recoverable article comprises shaping the polymeric material into the desired heat-stable form, subsequently cross-linking the polymeric material, heating the article to a temperature above a transition temperature thereof, for example, the crystalline melting point or, for amorphous materials, the softening point, of the polymer, deforming the article and cooling the article while in the deformed state so that the deformed state of the article is retained. In use, since the deformed state of the article is heat-unstable, application of heat to raise the temperature above the transition temperature will cause the article to assume its original heat-stable shape.

Where the term "recovery temperature" in connection with heat-recoverable articles is used herein, it is intended to refer to the transition temperature above which the article recovers even if some small degree of recovery is exhibited at temperatures slightly below the transition temperature.

In other articles, as described, for example in British Patent No. 1,440,524, an elastomeric member such as an outer tubular member is held in a stretched state by a second member, such as an inner tubular member, which, upon heating weakens and thus allows the elastomeric member to recover. This property can be utilized to impel the uncured adhesive composition 20 against a substrate in contact with which the uncured adhesive composition will reach a sufficient temperature to cure, thereby bonding the heat shrinkable solid polymer 16 to the substrate. In one preferred embodiment of the present invention the polymeric layer 16 and the uncured adhesive composition 20 are co-extruded in the form of a tube (See FIG. 3), for example, with the uncured adhesive composition 20 forming the inside portion of the tube. Such a tube can be slid over the end portions 22 and 24 of the pipes 12 and 14 and then heated whereby the tube shrinks and forms a tight fit about the pipe ends 22 and 24 and the uncured adhesive composition simultaneously or thereafter cures thereby connecting the two pipe ends 22 and 24 to one another in a leak proof manner as shown in FIG. 4. An external heat source can be used to motivate the shape recovery or if the polymeric layer 16 is conductive, a current can be passed through it thereby heating it and motivating the shape recovery. Alternatively, an electrical current can be passed through a conductor adjacent to or embedded in the heat recoverable article as disclosed in U.S. Pat. No. 4,944,987.

If the article of manufacture 10 is in sheet form, it can be wrapped around or against a substrate to which bonding is desired. For example, a sheet of the composite article 10 can be wrapped around the pipe ends 22 and 24 and then heated, causing the heat recoverable polymer layer 16 to shrink and the uncured composition 20 to cure and bond to the pipe end portions 22 and 24, forming a leak proof joint. A separate heat recoverable member 26 may be placed around an adhesive composition 20 alone (see FIG. 2), which is itself positioned or wrapped around the pipe ends 22 and 24. When the external heat recoverable article shrinks, it serves to compress the adhesive composition 20 against the pipe ends 22 and 24. The uncured adhesive composition 20 is heated and cures, forming a leak-proof pipe joint.

The articles according to the invention may be formed in a number of configurations depending on the particular use. The articles may be in the form of a tube that has had the recoverable polymer 16 extruded and expanded radially to render it heat-recoverable, the tube being either in continuous lengths or discrete pieces and being coated on its internal surface with the adhesive composition 20. Alternatively, the articles may be in the form of a sheet or tape that can be wrapped or wound, e.g. in a helical manner, around an object. More complex shapes, commonly referred to as boots, transitions, udders or caps, may be formed by molding a heat recoverable article in the desired configuration and then expanding, or by the methods described in U.S. Pat. Nos. 4,342,800 (Changani et al), 4,496,410 (Davis et al) and 4,366,201 (Changani et al), the disclosures of which are incorporated herein by reference. The present invention is also suitable for the production of wrap-around devices. So called wrap-around devices are employed for sealing, insulating or otherwise protecting a substrate where the use of a preformed tubular article such as a sleeve is not possible or convenient, e.g. in the case where the end of an elongate substrate is not accessible. In general, such wrap-around articles comprise at least a portion thereof which is adapted to be wrapped around a substrate to be covered and secured in tubular form by closure means. Thereafter, the wrap-around closure may be heat-recovered tightly onto the substrate by application of heat. Examples of wrap-around devices are described in U.S. Pat. Nos. 3,379,218 (Conde), 3,455,336 (Ellis), 3,530,898 (Wilson), 3,542,077 (Muchmore) and 4,392,898 (Pithouse et al), the disclosures of which are incorporated herein by reference. Alternatively, the adhesive composition 20 can be wrapped around such a substrate and a separate heat recoverable closure can be heat recovered tightly onto it thereby forcing it into tight contact with the substrate. Another form of wrap-around device in which the curable adhesive may be used is that described in U.S. Pat. No. 4,392,898 (Pithouse et al) in which the curable adhesive is used to form a layer of sealant that may be peeled away at any desired point to expose a closure adhesive.

In accordance with the present invention the cured adhesive composition 20 may have disbursed therein one or more additional fillers and additives. Generally up to about 60 volume percent filler can be present depending on the type of filler used. The fillers and additives which can be used include polymeric powders such as polytetrafluoro-ethylene (e.g. Teflon™ powder), nylon, ETFE, polyethylene, and other plastic powders; inorganic fillers such as fumed silica, calcium carbonate, magnesium carbonate, aluminum hydroxide, kaolin, and talc; chopped glass or continuous glass; fibers such as Kevlar™ (a polyaramide) fiber, graphite, fiberglass, and other reinforcing fibers; and other components such as stabilizers and anti-oxidants, pigments, foaming agents, fungicides and the like. For some applications, it may be desirable to have fibrous fillers dispersed in the adhesive in order to provide strength to the final cured article as well as to reduce the cost. When the adhesive is to be used for pipe coupling applications, it has been found that magnesium carbonate is a particularly useful filler because it will foam up and maintain a tight pipe seal if the pipe seal is heated sufficiently to compromise its integrity, e.g., if it is exposed to fire. Fabric weaves of any type may be present as a filler material in which case a pre-preg will be formed. For example, the weave can be plain, satin, leno, twill, crowfoot, or any other weave, at any weight of fabric from 0.6 to 40 oz/yd$^2$ (0.020 to 1.36 kg/m$^2$), and any thickness, e.g. from 0.0012 to 0.045 inch (0.0030 to 0.114 cm). The fabrics can be balanced in strength or can have more fibers (and correspondingly higher strength) in one direction than in another. For some applications it is preferred that the fabric comprise both longitudinal fibers and fibers at 45° angles to the longitudinal fibers.

Thermally conductive fillers such as boron nitride, alumina or aluminum nitride, are particularly useful for applications in which it is important that heat be efficiently transferred from the heat-recoverable article to the adhesive. Such thermal conductive fillers are generally present at 20 to 60% by volume of the composition, preferably 30 to 55% by volume, particularly 35 to 50% by volume.

An electrically conductive particulate filler may also be dispersed in the composition in order to provide electrical conductivity or static dissipation. Suitable particulate conductive fillers include carbon black, graphite, metals such as nickel, copper, and silver, metal oxides, metal-coated particles such as nickel-coated carbon fibers, nickel-coated carbon black, nickel-coated polymeric fibers, or silver-coated glass, or a combination of these. The amount of conductive filler required is dependent on the properties of the filler itself, the resins in the composition, the desired resistivity, and the extent of cure of the composition. In general, the conductive filler is present at 5 to 65%, preferably 10 to 60%, particularly 15 to 55%, especially 20 to 50% by volume of the total polymeric component of the composition. For static dissipation applications, a resistivity of approximately $10^6$ to $10^9$ ohm-cm is preferred. For applications in which the composition is used in a heater, a resistivity of approximately $10^2$ to $10^6$ ohm-cm is preferred. For both static dissipation and heater applications, it is preferred that the particulate conductive filler comprise carbon black. Suitable carbon blacks for compositions exhibiting PTC behavior include Raven™ 430 (available from Columbian Chemicals) and Vulcan™ XC-72 (available from Cabot), at a loading of 10 to 40% by volume, preferably 15 to 35% by volume, particularly 20 to 35% by volume of the polymeric component. For some applications, in which the composition exhibits ZTC (zero temperature coefficient of resistance) behavior, highly conductive carbon blacks such as Ketjenblack™ EC (available from Akzo Chemie), Conductex™ 975 (available from Cabot), or Printex™ XE-2 (available from DeGussa) are used and the loading of carbon black is much lower, generally 2 to 15% by volume, preferably 5 to 12% by volume, particularly 5 to 10% by volume. When the composition is to be used in a circuit protection device or as a conductive "tie" layer between an electrode and another conductive layer, a resistivity of $10^{-4}$ to $10^2$ ohm-cm is preferred. For these conductive compositions, although carbon black may be used, it is preferred that the conductive filler comprise metal particles such as nickel, e.g. Inco™ 255 (available from Novamet), or silver, e.g. FS-2™ flake, (available from Johnson Matthey Electronic Materials), or fibers, e.g. Cycom™ NCG nickel-coated carbon fibers (available from American Cyanamid), or other metal-coated fibers such as glass, graphite, or polymer. When metal is used as the particulate filler, because of its relatively high density compared to the resins, the loading can be high, generally 20 to 60% by volume of the polymeric component, preferably 30 to 60% by volume, particularly 35 to 60% by volume. Because of the relatively high viscosity and ductility of the polymeric component, a relatively large quantity of particulate filler can be successfully incorporated into the adhesive composition without substantially adversely affecting the physical properties and ability to process the filled composition. Examples of compositions of this type can be found in copending, commonly assigned U.S. application Ser. No. 07/788,655 (Rinde et al), filed Nov. 6, 1991, the disclosure of which is incorporated herein by reference.

For many applications, it is desirable that the conductive polymer composition exhibit PTC behavior. The term "PTC behavior" is used in this specification to denote a composition or an electrical device which has an $R_{14}$ value of at least 2.5 and/or an $R_{100}$ value of at least 10, and it is particularly preferred that the composition should have an $R_{30}$ value of at least 6, where $R_{14}$ is the ratio of the resistivities at the end and the beginning of a 14° C. temperature range, $R_{100}$ is the ratio of the resistivities at the end and the beginning of a 100° C. range, and $R_{30}$ is the ratio of the resistivities at the end and the beginning of a 30° C. range. The temperature at which the composition is cured, $T_{cure}$, affects the temperature at which the resistance anomalously increases. In general, the higher $T_{cure}$, the higher the temperature at which the composition "switches" into its high resistance state. Compositions which exhibit PTC behavior are particularly useful in making electrical devices such as circuit protection devices or self-regulating heaters. Such devices comprise a resistive element comprising a polymeric component which is made from the conductive polymer composition, and two electrodes which can be connected to a source of electrical power to cause current to flow through the resistive element.

Appropriate electrodes are selected depending on the shape of the resistive element. Electrodes may comprise metal wires or braid, e.g. for attachment to or embedment into the resistive element, or they may comprise metal foil or mesh, or conductive paint, or any other suitable material. Generally circuit protection devices have a resistance at room temperature of less than 100 ohm-cm.

In certain embodiments, it is advantageous to incorporate into the adhesive relatively minor amounts of the material to which the adhesive is to bond, i.e. the material of the heat recoverable article or the substrate. In accordance with an embodiment of the present invention some of the same polymeric material which forms the polymeric layer 16 can be disposed in the uncured adhesive composition 20 to aid in adhesion of the solid polymer 16 to the uncured adhesive composition 20. If the substrate to which the heat recoverable article is to be bonded comprises a polymeric material, some of the polymeric material forming the substrate (or its outer surface) can be added to the uncured adhesive composition to aid in adhesion of the adhesive to the substrate. Generally from about 5 to about 50 volume percent (based on total volume of the adhesive composition 20, more preferably from about 15 to about 30 volume percent of the solid polymer, can be dispersed in the adhesive composition 20). This is useful both when the composite article 10 is tubular and is made by coextrusion and when the composite article 10 is sheet like or ribbon like in form.

The invention is particularly advantageous where the substrate to be enclosed comprises the end regions of two pipes positioned end to end. The pipes can be of fiber reinforced plastic (FRP), glass fiber reinforced plastic (GRP), metal or the like. The pipes need not be the same. For example, one may be of fiber reinforced plastic and the other of copper, a copper alloy, or stainless steel. Further the pipes can be at an angle, for example up to about 15°, to one another. The pipes may also be of different diameters or not perfectly concentric. For some applications it is preferred to use an electrically heated recoverable article such as described in U.S. Pat. Nos. 4,853,165 and 4,944,987 or European application No. 307,197. The heat recoverable article may be removed after the adhesive composition has substantially cured. A release agent between the adhesive and the heat recoverable article can be provided, if desired, to facilitate removal of the recovered article. A low profile pipe joint results. The end of the pipes may be machined to reduce the outside diameter thereof to about the thickness of the adhesive layer to provide a joint with substantially the same outer diameter as the joined pipes. The invention can also be used to join a pipe to a bulkhead feedthrough or the like.

Figure 5:
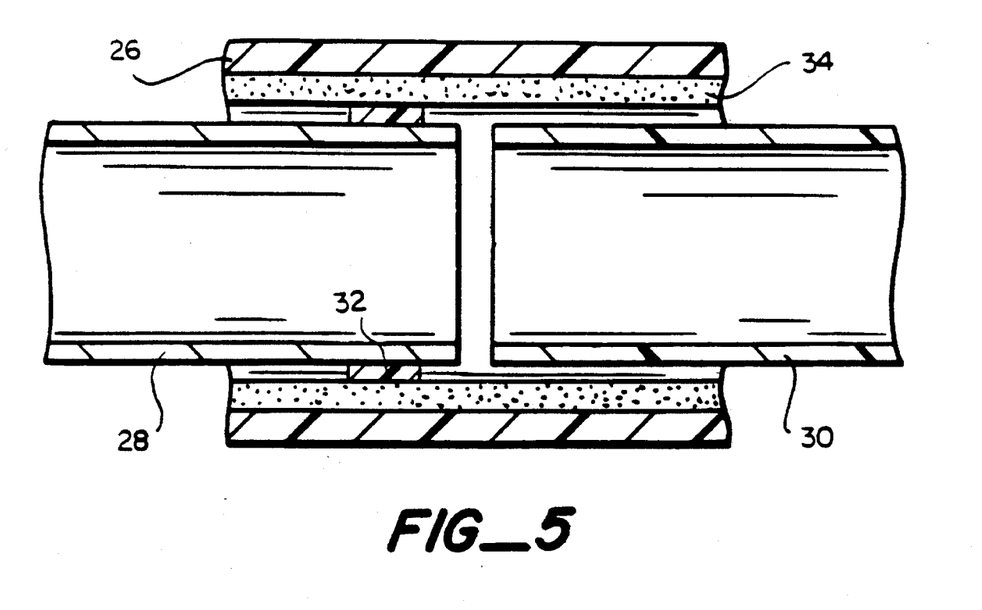
FIG. 5 illustrates, in cross-sectional view, an assembly for joining pipes in accordance with the third aspect of the invention prior to the formation of a pipe joint.
Figure 6:
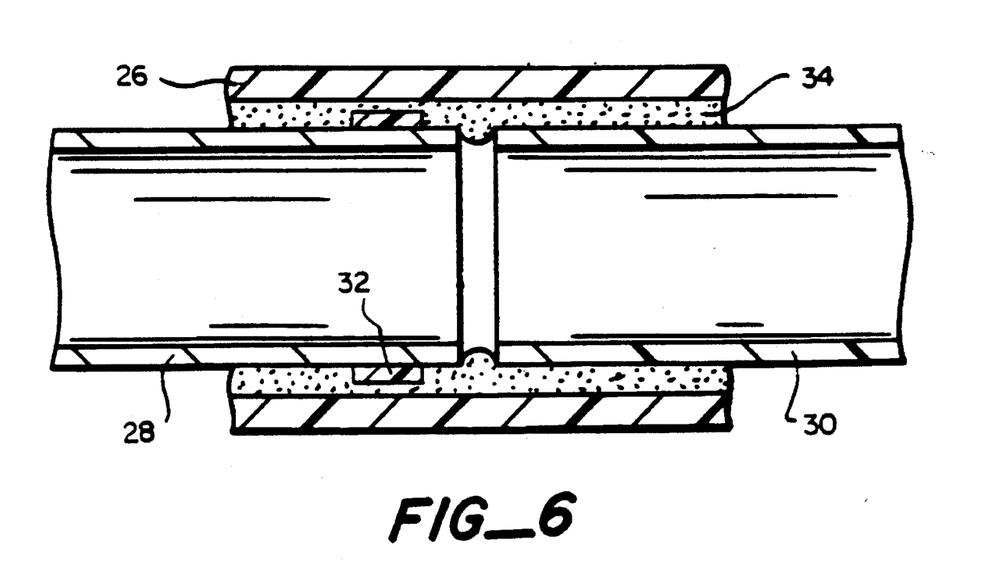
FIG. 6 illustrates, in cross-sectional view, an assembly for joining pipes in accordance with the third aspect of the invention after the pipes have been joined.

When it is necessary to join two pipes or other substrates which comprise different materials, there may be differential expansion and contraction of the two pipes when they are first heated to cure the adhesive of the invention and/or to recover the heat recoverable article, and then are cooled. For example, a metal pipe, such as a copper or copper/nickel alloy pipe, shrinks when it cools to a greater extent than an FRP pipe. As a result, the metal pipe may shrink away from the adhesive when it cools, weakening the join between the two pipes. For such situations it is advantageous to use, in addition to the adhesive of the invention, a polymeric insert, which may comprise a second adhesive, which can be positioned between the pipe which is prone to greater shrinkage and the thermosetting adhesive in order to maintain a tight seal between that pipe and the adhesive of the invention. Embodiments of this type are shown in FIGS. 5 and 6. Generally it is preferred that the polymeric insert bond to both the pipe and the thermosetting adhesive, although in some applications, if the polymeric insert is maintained in compression but does not bond, an adequate seal is maintained. The polymeric insert is also useful if two similar pipes are joined but they have substantially different expansion coefficients than the thermosetting adhesive. In that case, the polymeric insert can be used on both pipes between each pipe and the adhesive of the invention. It is particularly advantageous if the polymeric insert is flexible and is thus capable of "absorbing" the differences of expansion between the pipe and the adhesive. Furthermore a flexible polymeric insert can be readily positioned around nonuniform substrates. The polymeric insert can be in any suitable form. For example, it may be in the form of a tape which is wrapped around the pipe or it can comprise an insert in the form of an o-ring which can be positioned over the end of the pipe. The composition of the polymeric insert depends on the nature of the substrate and the adhesive of the invention. For example, the polymeric insert can be an elastomeric material which can be crosslinked or cured during installation, or it can be a thermoplastic polymeric material which may or may not be crosslinked. Particularly preferred are hot-melt adhesives which can melt and flow when heated, thus filling in voids and making good contact to the substrate. Hot-melt adhesives of this type are disclosed in U.S. Pat. No. 4,866,252 (van Loo et al), the disclosure of which is incorporated herein by reference. In order to ensure that the greatest mechanical strength of the bond is achieved, it is preferred that the polymeric insert cover at most 60% of the bonding surface between the substrate and the thermosetting adhesive, particularly at most 50%, especially at most 40%, e.g. 30%.

FIGS. 5 and 6 illustrate the third aspect of the invention in which a polymeric insert as described above is used in making an assembly for joining pipes. FIG. 5 shows, in cross-sectional view, metal pipe 28 positioned adjacent FRP pipe 30. Polymeric insert 32 is positioned near the end of the metal pipe 28 and is covered by a polymeric layer 34 which is a pre-preg containing the thermosetting adhesive. A heat-recoverable member 26 surrounds pre-preg 34. Following recovery of heat-recoverable member 26, the thermosetting adhesive in pre-preg 34 fills the gap between pipes 28 and 30, as shown in FIG. 6.

The following examples show the preparation of the adhesive composition 20 and of composite articles 10, as well as a conductive polymer composition of the invention.

EXAMPLE 1

In a 1 liter resin kettle were charged 105 grams flexible epoxy resin (Dow Chemical DER™ 732), 45 g bisphenol F epoxy resin (Ciba-Geigy GY-281™) and 150 g phenoxy resin (Union Carbide PKH-J™). The mixture was stirred and heated until the phenoxy resin dissolved in the epoxy resins. The temperature reached 177° C. The clear material was poured onto Teflon™-coated release paper and cooled to room temperature. To 300 grams of the cooled material was added 7.3 grams dicyandiamide and 3.75 grams of (3-phenyl-1,1-dimethylurea) and the mixture was mixed in a Brabender™ mixer at 20 RPMs for 10 minutes until uniform. The temperature during mixing was below 80° C. The adhesive was pressed into 0.015 inch (0.381 cm) thick flexible and non-sticky slabs. Cut strips of this adhesive were positioned inside heat shrinkable molded parts and the parts were bonded together using a heat gun to heat and recover the parts. Final cure was at 150° C. for 35 minutes which produced a flexible adhesive. Reheating the parts to 150° C. without the clamping pressure produced no failures. Elongation of a sample cured for 45 minutes at 160° C. was 79.5% at room temperature. Another adhesive made using the same procedure and materials as above, but with 45% phenoxy resin, had an elongation at failure of 233% after curing.

EXAMPLE 2

Using the procedure of Example 1, 180 grams of phenoxy resin (Union Carbide PKH-J) and 420 grams of Epon™ 825 (Shell Chemical) were melt blended until uniform, poured out and cooled to room temperature. This material was blended with dicyandiamide/2-phenyl-4,5-dihydroxy-methylimidazole curing agents at a temperature of less than about 80° C., and cured at 175° C. for 3 hours to give a molded article with an epoxy $T_g$ at 130° C.

EXAMPLE 3

Using the procedure of Example 1, 180 grams of polysulfone (Union Carbide P-1700™) and 420 grams of Epon 825 were melt blended until uniform, poured out and cooled to room temperature. This material was blended with dicyandiamide/2-phenyl- 4,5-dihydroxy-methylimidazole curing agents at a temperature of less than about 80° C., and cured at 175° C. for 3 hours to give a molded article with an epoxy $T_g$ at 130° C. This adhesive also had a second $T_g$ of 197° C. due to the presence of the polysulfone.

EXAMPLE 4

Using the procedure of Example 1, 180 grams of powdered Ultem™ 1000 (General Electric Company) and 420 grams of Epon 825 were melt blended until uniform, poured out and cooled to room temperature. This material was blended with dicyandiamide/2-phenyl-4,5-dihydroxymethylimidazole curing agents (the temperature during blending was below about 80° C.), and cured at 175° C. for 3 hours to give a molded article with an epoxy $T_g$ at 133° C. and a second $T_g$ of 199° C. due to the Ultem.

EXAMPLE 5

Using the procedure of Example 1, 180 grams of powdered Ultem 1000, 18 g Cab-O-Sil™ TS-720 fumed silica (Cabot) and 420 grams of Epon 825 epoxy were melt blended until uniform, poured out and cooled to room temperature. 282 g of this material was blended at a temperature of less than about 80° C. with 7.6 g dicyandiamide, 2.0 g 2-phenyl-4,5-dihydroxy-methyl-imidazole, and 0.2 g Monstral violet to produce a flexible non-sticky sheet of adhesive. The adhesive was used to bond together a heat shrinkable tubing based on a modified ETFE. A peel strength of 26 pli (pounds per linear inch; 4.65 kg/linear cm) was measured at room temperature.

EXAMPLE 6

Using the procedure of Example 1, 210 grams of powdered Ultem 1000 and 390 grams of Epon 825 were melt blended until uniform, poured out and cooled to room temperature. 282 g of this material was blended at a temperature of less than about 80° C. with 7.6 g dicyandiamide, 2.0 g 2-phenyl-4,5-dihydroxymethylimidazole, and 0.2 g Monstral violet to produce a flexible non-sticky sheet of adhesive. The adhesive was used to bond together a heat shrinkable tubing based on ETFE. A peel strength of 17 pli (3.04 kg/linear cm) was measured at room temperature.

EXAMPLE 7

Using the adhesive from Example 6, 15 grams of powdered ETFE were mixed into the adhesive on a Warren two roll mill and blended until uniform. The filled adhesive was used to bond together a heat shrinkable tubing based on ETFE. The resulting adhesive had a peel strength of 26 pli (4.65 kg/linear cm) when measured at room temperature.

EXAMPLE 8

A 50 parts solution of adhesive was prepared by dissolving 108 g Ultem 1000 and 252 g Epon 825 in methylene chloride and then stirring in 9.7 g dicyandiamide and 2.5 g 2-phenyl-4,5-dihydroxymethylimid-azole at room temperature. This solution was used to impregnate fiberglass cloth which was air dried at room temperature and then at 70° C. for one hour in a vacuum oven. The cloth, which was flexible and non-sticky, was used to bond fiberglass reinforced pipe (GRP) together with an electrically conductive heat shrinkable sleeve as described in U.S. Pat. No. 4,853, 165. It also successfully bonded GRP together by means of an electrically conductive heat shrinkable sleeve as described in European patent application No. 307,197. The cloth was also successfully used to join a GRP pipe to a steel pipe.

EXAMPLE 9

A solution of adhesive was prepared by dissolving 30 g Ultem 1000 and 70 g Epon 825 in methylene chloride and then stirring in 20 g talc (magnesium silicate), 20 g $MgCO_3$, 20 g $Al(OH)_3$, 3.0 g dicyandiamide and 0.7 g 2-phenyl-4, 5-dihydroxymethylimidazole. Fiberglass pre-pregs were made and used to join together steel and copper pipes. Thermal mechanical analysis (TMA) showed that the cured adhesive expanded 20% in the temperature range from 350° to 375° C. in order to maintain a positive seal for pipe couplings.

EXAMPLE 10

The filled adhesive composition from Example 9 was prepared from a master batch of 30% Ultem 1000/70% Epon 825 theft had been melt blended. This master batch was mixed with fillers and curing agents in a Brabender mixer using the procedures of Example 1. The adhesive was cut into strips and fed into a three zone Brabender extruder heated to 80° to 100° C. and through a die heated to 110° C. The extruder was operated at 22 RPMs. A flexible non-sticky tape 0.012 inch thick by one inch wide (0.030 cm by 2.54 cm) was produced.

EXAMPLE 11

An adhesive composition of 29.0% Ultem 1000, 67.7% Epon 825, 2.6% dicyandiamide, 0.7% 2-phenyl-4,5-dihydroxymethylimidazole and 0.07% Monstral violet was melt blended as in Example 1. After 1.7 years of aging at room temperature the adhesive was still non-sticky and flexible and usable as an adhesive. DSC (differential scanning calorimeter) analysis of aged adhesive showed no decrease in the cure exotherm, i.e. the area under the DSC curve, when compared to the freshly made adhesive. After 2.0 years of aging at room temperature the adhesive was still non-sticky and flexible and the DSC analysis showed an 8% decrease in the area under the cure exotherm. Other studies, at elevated temperatures, showed that a 15–20% decrease in area under the cure exotherm results in brittle adhesives.

EXAMPLE 12

Compositions containing an epoxy resin and a thermoplastic resin, as designated in the following Table I, were prepared. The compositions were formed into strips of material 0.25 inch (0.635 cm) wide and 0.010 to 0.015 inch (0.025 to 0.038 cm) thick. The strips were wrapped around round mandrels at room temperature (RT, i.e. approximately 25° C.) and 0° C. The results are reported as number of samples passing (P)/number of samples tested. A sample is said to pass if it exhibited no cracking when wrapped around the mandrel.

TABLE I

| Mandrel diameter (inch) | 0.125 | 0.188 | 0.25 | 0.375 | 0.5 |
|---|---|---|---|---|---|
| Mandrel diameter (cm) | 0.318 | 0.478 | 0.635 | 0.953 | 1.27 |

Mandrel wraps at RT

| | | | | | |
|---|---|---|---|---|---|
| Epon 1001 (Control - solid epoxy) | | | | | 0P/3 |
| LDPE (Control - low density polyethylene) | 3P/3 | | | | |
| 30/70 Ultem 1000/Epon 825 | 3P/3 | | | | |
| 35/65 Ultem 1000/Epon 825 | 3P/3 | | | | |
| 40/60 Ultem 1000/Epon 825 | 3P/3 | | | | |
| 45/55 Ultem 1000/Epon 825 | 3P/3 | | | | |
| 30/70 Ultem 1000/Epon 825 + 35% filler | 0P/3 | 0P/3 | 0P/3 | 3P/3 | 1P/1 |
| 35/65 Udel/Epon 825 | 3P/3 | | | | |
| 40/60 Udel/Epon 825 | 3P/3 | | | | |
| 45/55 Phenoxy/GY-281 | 3P/3 | | | | |
| 30/49/21 Siltem 1500/C353/T121 | 3P/3 | | | | |
| 50/38/12 Siltem 1500/C353/T121 | 3P/3 | | | | |
| 60/30/10 Siltem 1500/C353/T121 | 3P/3 | | | | |
| 75/19/6 Siltem 1500/C353/T121 | 3P/3 | | | | |

Mandrel wraps at 0° C.

| | | | | | |
|---|---|---|---|---|---|
| 30/70 Ultem 1000/Epon 825 | 1P/3 | 3P/3 | 2P/3 | | |
| 35/65 Ultem 1000/Epon 825 | | | 0P/3 | 1P/3 | 3P/3 |
| 40/60 Ultem 1000/Epon 825 | 0P/3 | | | 0P/3 | 0P/3 |
| 45/55 Ultem 1000/Epon 825 | | | | | * |
| 30/70 Ultem 1000/Epon 825 + 35% filler | | | | | 0P/3 |
| 40/60 Udel/Epon 825 | 0P/1 | | | | 0P/3 |
| 45/55 Phenoxy/GY-281 | | | | | 0P/3 |
| 30/49/21 Siltem 1500/C353/T121 | | | | | 0P/3 |
| 50/38/12 Siltem 1500/C353/T121 | 0P/2 | 0P/1 | 2P/3 | 3P/3 | |
| 60/30/10 Siltem 1500/C353/T121 | 3P/3 | | | | |
| 75/19/6 Siltem 1500/C353/T121 | 3P/3 | | | | |

* Estimated passing at 1.5 to 2 inch (3.81 to 5.08 cm) diameter mandrel

EXAMPLE 13

Compositions containing an epoxy resin and a thermoplastic resin, as designated in the following Table II, were prepared as described in the previous examples. Blocking of the compositions was tested by the method of ASTM D-1146-53 at room temperature (RT), 50° C. and 60° C. The results are shown in Table II.

TABLE II

| Material | RT | 50° C. | 60° C. |
|---|---|---|---|
| 15/85 Ultem 1000/Epon 825* | 2 | | |
| 20/80 Ultem 1000/Epon 825* | 2 | 3 (40°) | |
| 25/75 Ultem 1000/Epon 825 | 3 | 3 (40°) | |
| 30/70 Ultem 1000/Epon 825 | 2 | 3 | |
| 35/65 Ultem 1000/Epon 825 | 2 | 3 | |
| 40/60 Ultem 1000/Epon 825 | 2 | 3 | |
| 45/55 Ultem 1000/Epon 825 | 1 | 2 | |
| 30/70 Ultem 1000/Epon 825 + 35% filler | 1 | 1 | 2 |
| 35/65 Udel/Epon 825 | 3 | | |
| 40/60 Udel/Epon 825 | 2 | 3 | |
| 45/55 Phenoxy/GY-281 | 1 | 3 | |
| 30/49/21 Siltem 1500/C353/T121 | 2 | 3 | 3 |
| 50/38/12 Siltem 1500/C353/T121 | 1 | 1 | 2 |
| 60/30/10 Siltem 1500/C353/T121 | | 1 | 2 |
| 75/19/6 Siltem 1500/C353/T121 | | 1 | 1 |

*two phase systems
Code:
1 = no blocking
2 = first degree blocking, no damage on separation
3 = second degree blocking, damage on separation

EXAMPLE 14 (Comparative Example)

To a solution of 15 g Ultem 1000 in methylene chloride was added 18.92 g 4,4'Bismaleimidodiphenylmethane (Matrimid 5292A from Ciba-Geigy) and 16.08 g O,O-diallyl bisphenol A (Matrimid 5292B from Ciba-Geigy) to produce a uniform solution. A brittle composition resulted when the solvent was removed.

EXAMPLE 15 (Comparative Example)

The procedure of Example 14 was repeated with the ratio of 5292A/5292B changed to increase flexibility (14 g 5292A/21 g 5292B). The uncured adhesive was still brittle at room temperature; however, the $T_g$ of the cured adhesive dropped to 165° C.

EXAMPLE 16 (Comparative Example)

The procedure of Example 14 was repeated using Siltem 1500 as the thermoplastic. To a solution of 15 g Siltem 1500 in methylene chloride was added 18.92 g Matrimid 5292A and 16.08 g Matrimid 5292B to produce a uniform solution. After removing the solvent the resulting adhesive composition was brittle.

EXAMPLE 17

To a solution of 15 g Siltem™ 1500 (General Electric Company) in methylene chloride was added 24.35 g bismaleimide of methylene dianiline and other bismaleimide resins (Shell Compimide™ 353) and 10.65 g bis(allyl diphenyl ether) (Compimide™ TM121 from Shell) to produce a uniform solution. After removing the solvent the resulting adhesive composition was a tough, flexible, non-sticky film at room temperature which could be wrapped around 0.125 inch (0.318 cm) mandrel at room temperature when 0.030 inch (0.076 cm) thick.

EXAMPLE 18

The formulation of Example 17 was repeated but at 36.5, 43.5 and 50.0% Siltem levels. All formulations passed the 0.125 inch (0.381 cm) mandrel wrap at 0.025 inch (0.064 cm) thickness.

EXAMPLE 19

Using a two-roll mill, 100 g of a thermally conductive filler (aluminum nitride with a thermal conductivity of 220 W/MK, available from Advanced Refractory Technologies), 5 g dicyandiamide and 3 g 3-phenyl-1,1-dimethyl urea were added to 100 g of a blend of Ultem 1000/Epon 825 (30/70 ratio). A flexible non-sticky sheet of adhesive was formed. The adhesive cured within one hour at 120° C.

EXAMPLE 20 using the procedure of Example 1, 150 g of a styrene acrylonitrile copolymer resin (Dow Chemical Tyrin™ 880B), and 350 g of Epon 825 were melt blended until uniform, poured out and cooled to room temperature. This material was blended with dicyandiamide/3-phenyl-1,1-dimethyl urea curing agents to form a flexible nonsticky adhesive, and was cured at 175° C. for 1 hour to give a molded article with an epoxy $T_g$ at 125° C.

EXAMPLE 21

Using the procedure of Example 1, 150 g of polymethyl methacrylate (Rohm & Haas V-811-100™) and 350 g of Epon 825 were melt blended until uniform, poured out and cooled to room temperature. This material was blended with dicyandiamide/3-phenyl- 1,1-dimethyl urea curing agents to form a flexible non-sticky adhesive, and was cured at 175° C. for 1 hour to give a molded article with an epoxy $T_g$ at 128° C.

EXAMPLE 22

Using a solution procedure, 225 g of a thermoplastic polyurethane rubber (B. F. Goodrich Estane™ 5703) were dissolved in chloroform and 125 g of a solid epoxy resin (Shell Epon™ 1001) and 150 g solid epoxy resin (Ciba Geigy ECN™ 1280) were added and dissolved to give a uniform solution. The solvent was evaporated at room temperature, 100° C. and in a vacuum oven at 140° C. This clear, tough, non-tacky and flexible material was blended with dicyandiamide/3-phenyl-1,1-dimethyl urea curing agents, and cured at 175° C. for 1 hour to give a molded article with an epoxy $T_g$ at 70° C. and a rubber $T_g$ at –5° C.

EXAMPLE 23

Following the procedure of Example 6, a flexible non-sticky sheet of adhesive was extruded. Fiberglass cloth with a weight of 30 oz/yd$^2$ (available from Advanced Textiles Inc.) was sandwiched between two layers of adhesive and the assembly was passed through heated rollers to to form an adhesive-impregnated cloth (pre-preg) with a final thickness of about 0.070 inch (0.177 cm).

A hot-melt adhesive comprising a modified polyamide and ethylene/vinyl acetate copolymer, as described in U.S. Pat. No. 4,018,733 (Lopez et al), the disclosure of which is incorporated herein by reference, was prepared in tape form with a width of 1 inch (2.4 cm) and a thickness of about 0.020 inch (0.051 cm).

The cut ends of a copper alloy (90% copper/10% nickel) pipe and a fiberglass reinforced plastic (FRP) pipe, each with a nominal inner diameter of 4 inches (10.2 cm), were placed abutting one another end to end as shown in FIG. 5 and a cloth tape was wrapped around the butted ends. Two strips of hot melt adhesive were positioned adjacent one another at the end of the copper alloy pipe to be joined. Four strips of pre-preg, each slightly more narrow than the previous strip, were wrapped around the abutted pipes. A heat-recoverable heater comprising a heat-recoverable polymeric material, a heat-activatable bonding material, and an expanded laminar metal heating element (Jointek™ 1000 available from Raychem Corporation) was wrapped around the pre-preg, covering the abutted pipes. An auxilliary flexible heater was spirally wrapped over the copper alloy pipe at a distance 0.5 inch (1.3 cm) from the heat-recoverable heater. The heat-recoverable heater was connected to a 14 volt/100 A power supply. Simultaneously the auxilliary heater was powered at 120 VAC. The heat-recoverable heater was held at 185° C. for 45 minutes to recover the heater, cure the adhesive and cause the hot-melt adhesive to melt and flow. After the assembled pipes cooled, there was an excellent bond from the copper alloy pipe to the hot-melt adhesive and from the hot melt adhesive to the adhesive in the pre-preg. In addition there was an excellent bond between the FRP and the adhesive in the pre-preg.

What is claimed is:

1. A method of enclosing a substrate comprising:
  (a) positioning a heat recoverable article around the substrate;
  (b) positioning a flexible layer of a thermosetting adhesive composition between the heat recoverable article and the substrate to be enclosed, said adhesive composition
    (i) comprising a blend of (1) about 25 to about 45 parts by weight of the adhesive composition of an essentially amorphous thermoplastic resin selected from the group consisting Of polysulfones, polyethersulfones, polystyrene, polyphenylene oxide, amorphous polyamides, phenoxy resins, amorphous polyimides, polyetherimides, polyetherimide/silicone block copolymers, polyurethanes, polycarbonates, and acrylic resins such as polymethyl methacrylate, styrene/acrylonitrile and styrene block copolymers, and (2) about 75 to about 55 parts by weight of the adhesive composition of an uncured thermosetting resin, and
    (ii) being such that it will remain substantially uncured for at least about one year at 25° C.; and
  (c) heating the article and adhesive to cause the article to recover toward the substrate and the adhesive to cure, thereby enclosing the substrate.

2. A method in accordance with claim 1, wherein steps (a) and (b) are carried out simultaneously by positioning around the substrate a heat recoverable article having a layer of the adhesive on the inner surface thereof.

3. A method in accordance with claim 1, wherein step (b) precedes step (a).

4. A method in accordance with claim 3, wherein the step of positioning the adhesive layer between the heat recoverable article and the substrate comprises wrapping a sheet of the adhesive around the substrate.

5. A method in accordance with claim 3, wherein the step of positioning the adhesive layer between the heat recoverable article and the substrate comprises wrapping a tape of the adhesive helically around the substrate.

6. A method in accordance with claim 1, wherein the substrate comprises adjacent sections of abutting pipes and the method of enclosing the substrate joins the pipes together.

7. A method in accordance with claim 1, wherein the adhesive composition further comprises a curing agent.

8. A method in accordance with claim 1 wherein the adhesive composition comprises a thermosetting resin selected from the group consisting of epoxy resins, polyurethanes, bismaleimide resins and unsaturated polyesters.

9. A method in accordance with claim 1, wherein the adhesive composition comprises a thermosetting resin comprising an epoxy resin and further comprises a curing agent selected from the group consisting of isophthaloyl dihydrazide, benzephenone tetracarboxylic dianhydride, diethyltoluene diamine, 3,5-dimethylthio-2,4-toluene diamine, dicyandiamide, substituted imidazoles, diaminodiphenyl sulfone, substituted ureas, substituted dicyandiamides, solid polyamides, solid aromatic amines, solid anhydrides, pyromellitic dianhydride, phenolic resin hardeners, poly(p-hydroxy styrene), imidazoles, 2-phenyl-4,5-dihydroxymethylimidazole and 2,4-diamino-6 [2'-mehthylimidazolyl-( 1)] ethyl-s-triazine isocyanate adduct, and boron trifluoride:amine complexes.

10. A method in accordance with claim 9, wherein the adhesive composition further comprises an curing accelerator.

11. An article of manufacture comprising a heat recoverable article having on a surface thereof a flexible layer of a thermosetting adhesive composition which (a) comprises a blend of (i) about 25 to about 45 parts by weight of the adhesive composition of an essentially amorphous thermoplastic resin selected from the group consisting of polysulfones, polyethersulfones, polystyrene, polyphenylene oxide, amorphous polyamides, phenoxy resins, amorphous polyimides, polyetherimides, polyetherimide/silicone block copolymers, polyurethanes, polycarbonates and acrylic resins such as polymethyl methacrylate, styrene/acrylonitrile and styrene block copolymers, and (ii) about 75 to about 55 parts by weight of the adhesive composition of an uncured thermosetting resin; and (b) is such that it will remain substantially uncured for at least about one year at 25° C.

12. An article in accordance with claim 11, wherein the adhesive composition further comprises a curing agent.

13. An article in accordance with claim 11, wherein the adhesive composition comprises a thermosetting resin selected from the group consisting of epoxy resins, polyurethanes, bismaleimide resins and unsaturated polyesters.

14. An article in accordance with claim 11, wherein the thermosetting resin comprising an epoxy resin and the adhesive composition further comprises a curing agent selected from the group consisting of isophthaloyl dihydrazide, benzephenone tetracarboxylic dianhydride, diethyltoluene diamine, 3,5-dimethylthio- 2,4-toluene diamine, dicyandiamide, substituted imidazoles, diaminodiphenyl sulfone, substituted ureas, substituted dicyandiamides, solid polyamides, solid aromatic amines, solid anhydrides, pyromellitic dianhydride, phenolic resin hardeners, poly(p-hydroxy styrene), imidazoles, 2-phenyl- 4,5-dihydroxymethylimidazole and 2,4-diamino-6 [2'- mehthylimidazolyl-( 1)] ethyl-s-triazine isocyanate adduct, and boron trifluoride:amine complexes.

15. An article in accordance with claim 11 which is in the form of a sheet, tape, tube or molded article.

16. A method of enclosing a substrate comprising:

(a) positioning a heat recoverable article around the substrate;

(b) positioning a flexible layer of a thermosetting adhesive composition between the heat recoverable article and the substrate to be enclosed, said adhesive composition (i) comprising a blend of (1) about 25 to about 45 parts by weight of the adhesive composition of an essentially amorphous thermoplastic resin selected from the group consisting of polysulfones, polyethersulfones, polystyrene, polyphenylene oxide, amorphous polyamides, phenoxy resins, amorphous polyimides, polyetherimides, polyetherimide/silicone block copolymers, polyurethanes, polycarbonates, and acrylic resins such as polymethyl methacrylate, styrene/acrylonitrile and styrene block copolymers, and (2) about 75 to about 55 parts by weight of the adhesive composition of an uncured thermosetting resin, and (ii) being such that it will remain substantially uncured for at least about one year at 25° C.;

(c) positioning a polymeric insert between the thermosetting adhesive layer and the substrate to be enclosed; and (d) heating the article, the thermosetting adhesive, and the polymeric insert to cause the article to recover toward the substrate and the thermosetting adhesive to cure, thereby enclosing the substrate.

17. A method in accordance with claim 16 wherein the polymeric insert is an adhesive.

18. A method in accordance with claim 17 wherein the polymeric insert comprises a hot-melt adhesive.

\* \* \* \* \*